United States Patent
Hong

(10) Patent No.: US 11,540,113 B2
(45) Date of Patent: Dec. 27, 2022

(54) TRANSMISSION CONFIGURATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 145 days.

(21) Appl. No.: 16/865,312

(22) Filed: May 2, 2020

(65) Prior Publication Data
US 2020/0260262 A1  Aug. 13, 2020

Related U.S. Application Data

(63) Continuation of application No. PCT/CN2017/112529, filed on Nov. 23, 2017.

(51) Int. Cl.
*H04W 8/22* (2009.01)
*H04W 76/27* (2018.01)
*H04W 24/02* (2009.01)

(52) U.S. Cl.
CPC ............ *H04W 8/22* (2013.01); *H04W 24/02* (2013.01); *H04W 76/27* (2018.02)

(58) Field of Classification Search
CPC ....... H04W 8/22; H04W 24/02; H04W 76/27; H04W 8/24; H04W 72/12; H04L 5/0053
See application file for complete search history.

(56) References Cited

U.S. PATENT DOCUMENTS

| 2014/0106774 A1* | 4/2014 | Siomina .............. H04W 64/00 455/456.1 |
| 2015/0079981 A1* | 3/2015 | Zhu ..................... H04W 8/06 455/434 |
| 2019/0182883 A1* | 6/2019 | He ...................... H04W 24/10 |
| 2020/0275326 A1* | 8/2020 | Ma ...................... H04W 76/30 |

FOREIGN PATENT DOCUMENTS

| CN | 101471871 A | 7/2009 |
| CN | 101848501 A | 9/2010 |
| CN | 101860964 A | 10/2010 |

(Continued)

OTHER PUBLICATIONS

CN First Office Action in Application No. 201780005932.7, dated Sep. 10, 2020.

(Continued)

*Primary Examiner* — Fred A Casca
(74) *Attorney, Agent, or Firm* — Syncoda LLC; Feng Ma

(57) ABSTRACT

A transmission configuration method can be applied to a base station and include: determining that a terminal is allowed to report a changed transmission capability when the transmission capability changes; generating a first configuration information, the first configuration information characterizes that the terminal is allowed to report the changed transmission capability when the transmission capability changes; sending the first configuration information to the terminal, such that when the transmission capability changes, the terminal obtains the changed transmission capability according to the first configuration information and sends the changed transmission capability to the base station.

17 Claims, 10 Drawing Sheets

Base station                                            Terminal

(56) References Cited

FOREIGN PATENT DOCUMENTS

| CN | 102045844 A | 5/2011 |
|---|---|---|
| CN | 103209403 A | 7/2013 |
| CN | 105722066 A | 6/2016 |
| CN | 106034103 A | 10/2016 |
| WO | 2011109375 A1 | 9/2011 |
| WO | 2016197800 A1 | 12/2016 |
| WO | 2019100281 A1 | 5/2019 |

OTHER PUBLICATIONS

Extended European Search Report in Application No. 17932986.7, dated Aug. 4, 2020.
Report of e-mail discussion—[95#30] Capability coordination for NR and LTE, R2-167065, 3GPP TSG-RAN WG2 Meeting #95bis, Kaohsiung, Taiwan, Oct. 10-14, 2016, Agenda Item 9.2.2.3.
Further discussion on UE capability signaling, R2-1700293, 3GPP TSG-RAN WG2 Nr Ad Hoc, Spokane, USA, Jan. 17-19, 2017, Agenda Item 3.2.2.7.
International Search Report in Application No. PCT/CN2017/112529, dated Jun. 27, 2018.

* cited by examiner

TRANSMISSION CONFIGURATION METHOD AND APPARATUS

CROSS-REFERENCE TO RELATED APPLICATION

This application is a continuation of International Application No. PCT/CN2017/112529 filed on Nov. 23, 2017, the disclosure of which is hereby incorporated by reference in its entirety.

BACKGROUND

With the continuous development of communication technologies, smart terminals have been widely adopted. In the new generation communication system, a new application scenario is provided, that is, EN-DC (EUTRAN NR-Dual Connectivity, LTE network and NR network dual connectivity) scenario. LTE (Long-Term Evolution) network is 4G network, and NR (New Radio) network is 5G network. As such, a terminal needs to maintain two communication links simultaneously, one for the LTE communication link, and one for the NR communication link.

SUMMARY

The present disclosure relates to the field of communication technology, and in particular, to a transmission configuration method and apparatus.

According to a first aspect of the embodiments of the present disclosure, a transmission configuration method is provided, the method is applied to a base station, and the method includes:

determining that a terminal is allowed to report a changed transmission capability when the transmission capability changes;

generating a first configuration information, the first configuration information is used to characterize that the terminal is allowed to report the changed transmission capability when the transmission capability changes;

sending the first configuration information to the terminal, such that when the transmission capability changes, the terminal obtains the changed transmission capability according to the first configuration information, and sends the changed transmission capability to the base station.

According to a second aspect of the embodiments of the present disclosure, a transmission configuration method is provided, the method is applied to a terminal, and the method includes:

receiving a first configuration information sent by a base station, the first configuration information is used to characterize that the terminal is allowed to report a changed transmission capability when the transmission capability changes;

when the transmission capability changes, acquiring the changed transmission capability of the terminal according to the first configuration information;

sending the changed transmission capability of the terminal to the base station, such that the base station configures a corresponding transmission link for the terminal according to the changed transmission capability of the terminal.

According to a third aspect of the embodiments of the present disclosure, a transmission configuration apparatus is provided, the apparatus is applied to a terminal, and the apparatus includes:

a processor;

memory, configured to store executable instructions of the processor;

where the processor is configured to:

receive a first configuration information sent by a base station, the first configuration information is used to characterize that the terminal is allowed to report a changed transmission capability when the transmission capability changes;

acquire the changed transmission capability of the terminal according to the first configuration information when the transmission capability changes; and send the changed transmission capability of the terminal to the base station, such that the base station configures a corresponding transmission link for the terminal according to the changed transmission capability of the terminal.

It should be understood that the above general description and the following detailed description are merely exemplary and explanatory, and should not limit the present disclosure.

BRIEF DESCRIPTION OF THE DRAWINGS

The accompanying drawings herein are incorporated in and constitute a part of the disclosure, illustrate embodiments consistent with the present disclosure, and together with the description to explain the principles of the present disclosure.

DETAILED DESCRIPTION

Exemplary embodiments will be described in detail here, examples thereof are illustrated in the accompanying drawings. When the following description refers to the accompanying drawings, unless there is otherwise indicating, the same numbers in different accompanying drawings characterize the same or similar elements. The embodiments described in the following exemplary embodiments do not represent all embodiments consistent with the present disclosure. Instead, they are merely examples of apparatuses and methods consistent with aspects of the present disclosure and as detailed in the appended claims.

The terminology used in the present disclosure is for the purpose of describing particular embodiments only, and is not intended to limit the disclosure. The singular forms "one," "the" and "this" used in the disclosure and the appended claims are also intended to include the majority form, unless the context clearly characterizes other meanings. It should also be understood that the term "at least one of" as used herein refers to and includes any or all possible combinations of one or more of the associated and listed items.

It should be understood that although the terms first, second, third, etc. may be used to describe various information in the disclosure, such information should not be limited to these terms. These terms are only used to distinguish the same type of information from each other. For example, the first information may also be referred to as second information without departing from the scope of the present disclosure. Similarly, the second information may also be referred to as the first information. Depending on the context, the word "in a case that" as used herein may be interpreted as "when," "while" or "in response to a determination."

A terminal generally updates its transmission capability information by a detaching or reattaching manner when the terminal updates a transmission capability. However, detaching or reattaching will cause service interruption, which will seriously affect business performance and user experience.

Figure 1:
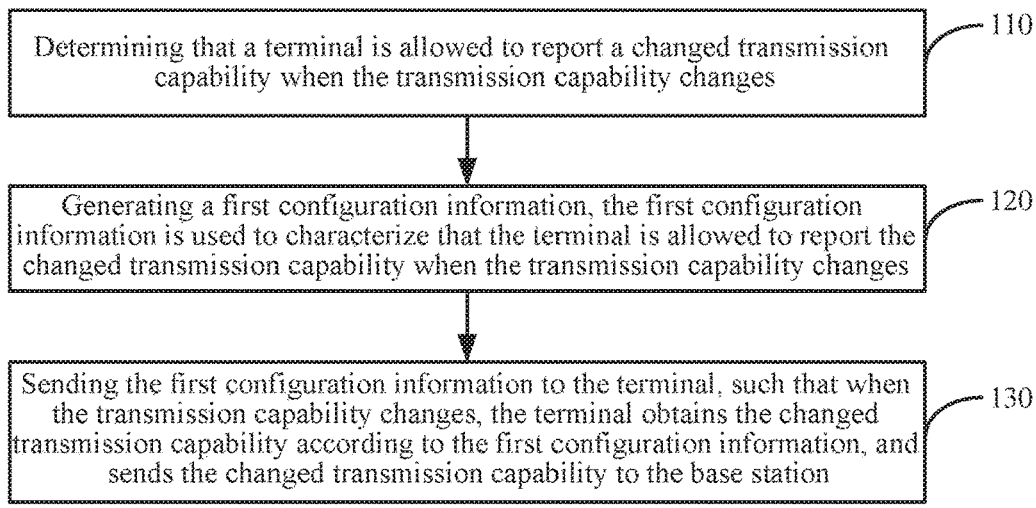
FIG. 1 is a flowchart illustrating a transmission configuration method according to some embodiments.
Figure 2:
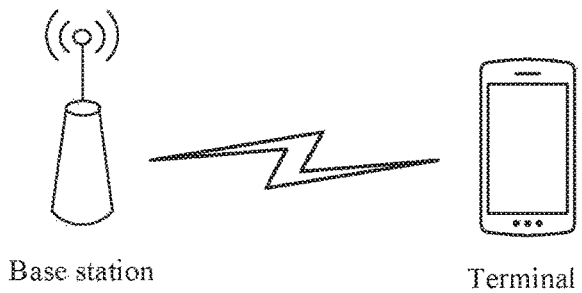
FIG. 2 is a schematic diagram illustrating a transmission configuration method according to some embodiments.

FIG. 1 is a flowchart illustrating a transmission configuration method according to some embodiments, and FIG. 2 is a schematic diagram illustrating a transmission configuration method according to some embodiments; the transmission configuration method can be applied to a base station. As shown in FIG. 1, the transmission configuration method can include the following steps 110-130.

In step 110, determining that the terminal is allowed to report the changed transmission capability when the transmission capability changes.

In some embodiments of the present disclosure, the base station may determine whether to allow the terminal to report the changed transmission capability when the transmission capability changes according to the actual situation; in a case that allowed, it can generate corresponding first configuration information to inform the terminal, such that the terminal can learn that the base station allows to report the changed transmission capability according to the first configuration information; in a case that disallowed, it can generate corresponding second configuration information, such that the terminal can learn that the base station doesn't allow to report the changed transmission capability according to the second configuration information.

In step 120, generating a first configuration information, and the first configuration information is used to characterize that the terminal is allowed to report the changed transmission capability when the transmission capability changes.

In step 130, sending the first configuration information to the terminal, such that when the transmission capability changes, the terminal obtains the changed transmission capability according to the first configuration information, and sends the changed transmission capability to the base station.

In an exemplary scenario, as shown in FIG. 2, a terminal and a base station are included. When the base station determines that the terminal is allowed to report the changed transmission capability when the transmission capability changes according to the actual situation, the base station will generate a first configuration information, the first configuration information is used to characterize that a terminal is allowed to report a changed transmission capability when the transmission capability changes, and sends the first configuration information to the terminal; after receiving the first configuration information, the terminal learns that the base station allows the terminal to report the changed transmission capability according to the first configuration information, such that the terminal will send the changed transmission capability to the base station when the transmission capability changes.

For example, when the terminal moves to the cell center or switches to a small cell, the channel quality between the terminal and the base station becomes better, the uplink transmission power of the terminal will decrease, thereby weakening the originally serious intermodulation interference, such that the transmission capability of the terminal changes. In some embodiments, the intermodulation interference herein may refer to: in a case that a terminal performs uplink transmission on two frequency bands at the same time, it may cause serious intermodulation interference to downlink reception in a certain frequency band.

As can be seen from the above described embodiment, the first configuration information is generated by determining that the terminal is allowed to report the changed transmission capability when the transmission capability changes, the first configuration information is used to characterize that a terminal is allowed to report a changed transmission capability when the transmission capability changes, and the first configuration information is sent to the terminal. Such that the terminal can report its changed transmission capability with the allowance of the base station, without the need to update its own transmission capability information by detaching or reattaching. Thereby, the individual needs of the terminal for dynamically reporting the changed transmission capability is met, the service performance and user experience of the terminal are not affected, and the practicality of the transmission configuration is improved.

Figure 3:
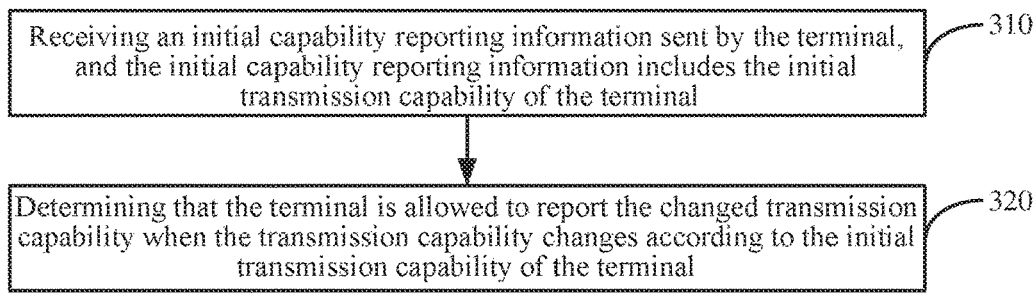
FIG. 3 is a flowchart illustrating another transmission configuration method according to some embodiments.

FIG. 3 is a flowchart illustrating another transmission configuration method according to some embodiments. This transmission configuration method can be applied to a base station. Based on the method shown in FIG. 1, when step 110 is performed, as shown in FIG. 3, it can include the following steps 310-320.

In step 310, receiving the initial capability reporting information sent by the terminal, and the initial capability reporting information includes the initial transmission capability of the terminal.

In step 320, determining that the terminal is allowed to report the changed transmission capability when the transmission capability is changed according to the initial transmission capability of the terminal.

In some embodiments of the present disclosure, after receiving the initial capability reporting information, the base station may determine whether to allow the terminal to report the changed transmission capability when the transmission capability changes according to the initial transmission capability of the terminal. in a case that allowed, it can generate corresponding first configuration information to inform the terminal, such that the terminal can learn that the base station allows to report the changed transmission capability according to the first configuration information; in a case that disallowed, it can generate corresponding second configuration information, such that the terminal can learn that the base station does not allow to report the changed transmission capability according to the second configuration information;

In addition, after receiving the initial capability reporting information, the base station may also configure a corresponding transmission link according to the initial capability reporting information, and inform the configured transmission link to the terminal, such that the terminal performs data transmission on the configured transmission link.

As can be seen from the above described embodiment, through receiving the initial capability reporting information sent by the terminal, the initial capability reporting information includes the initial transmission capability of the terminal, and determines that the terminal is allowed to report the changed transmission capability when the transmission capability changes according to the initial transmission capability of the terminal, thereby improving the reliability of the transmission configuration.

In some embodiments, based on the method shown in FIG. 3, the initial transmission capability of the terminal in the above described step 310 can include at least one of all frequency band combinations and channel combinations, and at least one of the all frequency band combinations and channel combinations can be supported by the terminal and do not generate intermodulation interference.

For example, the frequency band combination is frequency band A and frequency band B, that is, the terminal supports simultaneous transmission on frequency band A and frequency band B.

As can be seen from the above described embodiment, the initial transmission capability of the terminal can include at least one of all frequency band combinations and channel combinations that the terminal can support without generating intermodulation interference, such that convenient for the base station to fully understand all the wireless transmission capability of the terminal, which is helpful for the base station to determine whether the terminal is allowed to report the changed transmission capability when the transmission capability changes, thereby improving the accuracy of the transmission configuration.

Figure 4:
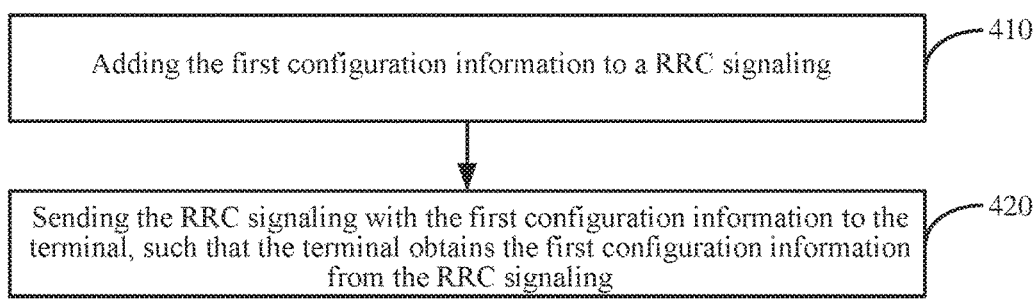
FIG. 4 is a flowchart illustrating another transmission configuration method according to some embodiments.

FIG. 4 is a flowchart illustrating another transmission configuration method according to some embodiments. This transmission configuration method can be applied to a base station, based on the method shown in FIG. 1, when step 130 is performed, the first configuration information may be sent to the terminal through RRC (Radio Resource Control) signaling, as shown in FIG. 3, it can include the following steps 410-420.

In step 410, adding the first configuration information to the RRC signaling.

In step 420, sending the RRC signaling with the first configuration information to the terminal, such that the terminal obtains the first configuration information from the RRC signaling.

As can be seen from the above described embodiment, through adding the first configuration information to the RRC signaling, and sending the RRC signaling with the first configuration information to the terminal, such that the terminal can directly obtain the first configuration information from the RRC signaling, thereby enriching the transmission mode of the first configuration information and also improving the reliability of the first configuration information transmission.

Figure 5:
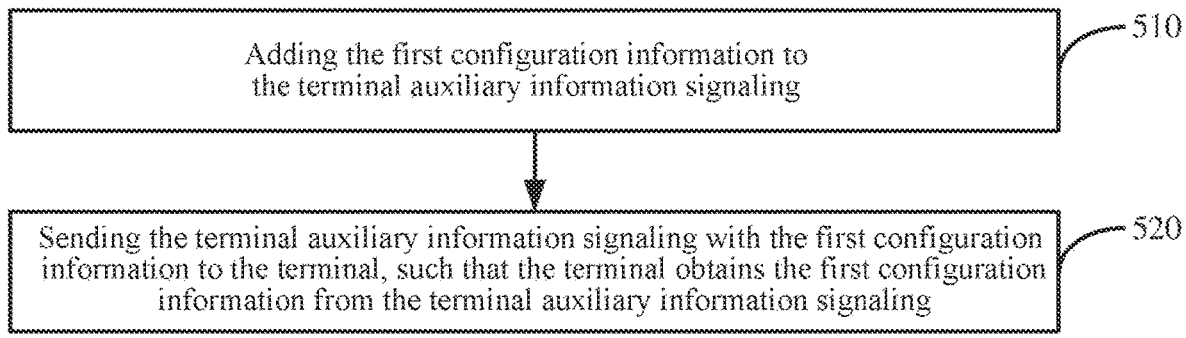
FIG. 5 is a flowchart illustrating another transmission configuration method according to some embodiments.
Figure 6:
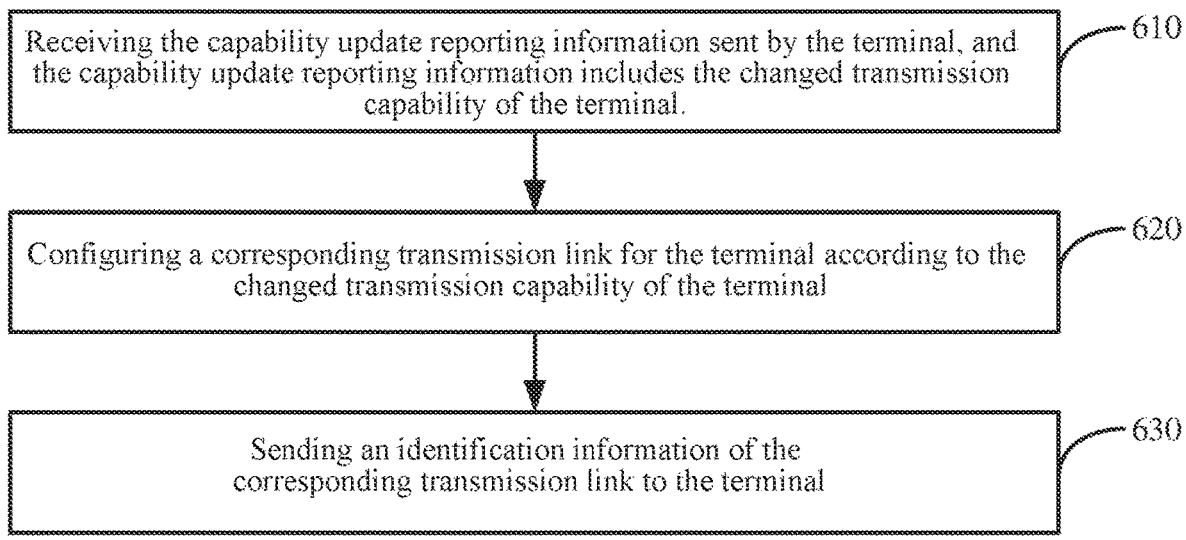
FIG. 6 is a flowchart illustrating another transmission configuration method according to some embodiments.

FIG. 5 is a flowchart illustrating another transmission configuration method according to some embodiments. This transmission configuration method can be applied to a base station, based on the method shown in FIG. 1, when step 130 is performed, the first configuration information may be sent to the terminal through terminal auxiliary information signaling, as shown in FIG. 6, it can include the following steps 510-520.

In step 510, adding the first configuration information to the terminal auxiliary information signaling.

In step 520, sending the terminal auxiliary information signaling with the first configuration information to the terminal, such that the terminal obtains the first configuration information from the terminal auxiliary information signaling.

As can be seen from the above described embodiment, through adding the first configuration information to the terminal auxiliary information signaling, and sending the terminal auxiliary information signaling with the first configuration information to the terminal, making the terminal obtain the first configuration information from the terminal auxiliary information signaling, such that the terminal can directly obtain the first configuration information from the terminal auxiliary information signaling, thereby enriching the transmission mode of the first configuration information and also improving the reliability of the first configuration information transmission.

FIG. 6 is a flowchart illustrating another transmission configuration method according to some embodiments. This transmission configuration method can be applied to a base station. Based on any one of the above described transmission configuration methods, as shown in FIG. 6, the transmission configuration method can further include the following steps 610-630.

In step 610, receiving the capability update reporting information sent by the terminal, and the capability update reporting information includes the changed transmission capability of the terminal.

In some embodiments of the present disclosure, the changed transmission capability of the terminal may be specified as: after the transmission capability of the terminal changes, at least one of all frequency band combinations and channel combinations that the terminal can support without generating intermodulation interference.

In step 620, configuring a corresponding transmission link for the terminal according to the changed transmission capability of the terminal.

In some embodiments of the present disclosure, since the transmission capability of the terminal changes, the base station needs to reconfigure the terminal with a transmission link for data transmission according to the changed transmission capability of the terminal, and informs the newly configured transmission link to the terminal, such that the terminal performs data transmission on the newly configured transmission link instead of performing data transmission on the previously transmission link configured by the base station.

For example, the previously transmission link configured by the base station may be a transmission link configured for data transmission according to the initial capability reporting information after the base station receives the initial capability reporting information sent by the terminal.

In step 630, sending the identification information of the corresponding transmission link to the terminal.

In some embodiments of the present disclosure, the identification information is used to characterize a corresponding transmission link configured by the base station for the terminal.

As can be seen from the above described embodiment, through receiving the capability update reporting information sent by the terminal, the capability update reporting information includes the changed transmission capability of the terminal, configuring a corresponding transmission link for the terminal according to the changed transmission capability of the terminal, and sending identification information of the corresponding transmission link to the terminal, such that the terminal can perform data transmission according to the transmission link newly configured by the base station, thereby improving data transmission quality and also improving transmission resource utilization.

Figure 7:
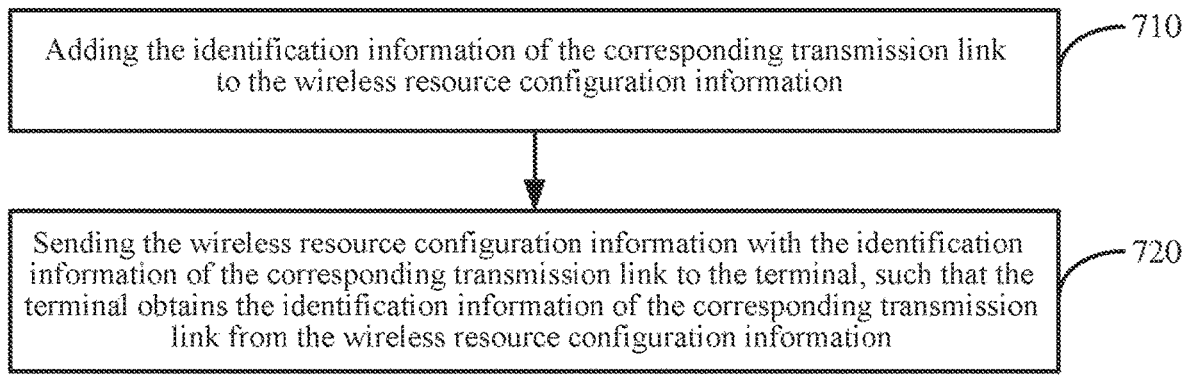
FIG. 7 is a flowchart illustrating another transmission configuration method according to some embodiments.

FIG. 7 is a flowchart illustrating another transmission configuration method according to some embodiments. This transmission configuration method can be applied to a base station, based on the method shown in FIG. 6, when step 630 is performed, the identification information of the corresponding transmission link may be sent to the terminal through wireless resource configuration information, as shown in FIG. 7, it can include the following steps 710-720.

In step 710, adding the identification information of the corresponding transmission link to the wireless resource configuration information.

In step 720, sending the wireless resource configuration information with the identification information of the corresponding transmission link to the terminal, such that the terminal obtains the identification information of the corresponding transmission link from the wireless resource configuration information.

As can be seen from the above described embodiment, through adding the identification information of the corresponding transmission link to the wireless resource configuration information, and sending the wireless resource configuration information with the identification information of the corresponding transmission link to the terminal, such that the terminal can directly obtain the identification information of the corresponding transmission link from the wireless resource configuration information, and then use the corresponding transmission link configured by the base station for data transmission, thereby improving the efficiency of transmission configuration.

Figure 8:
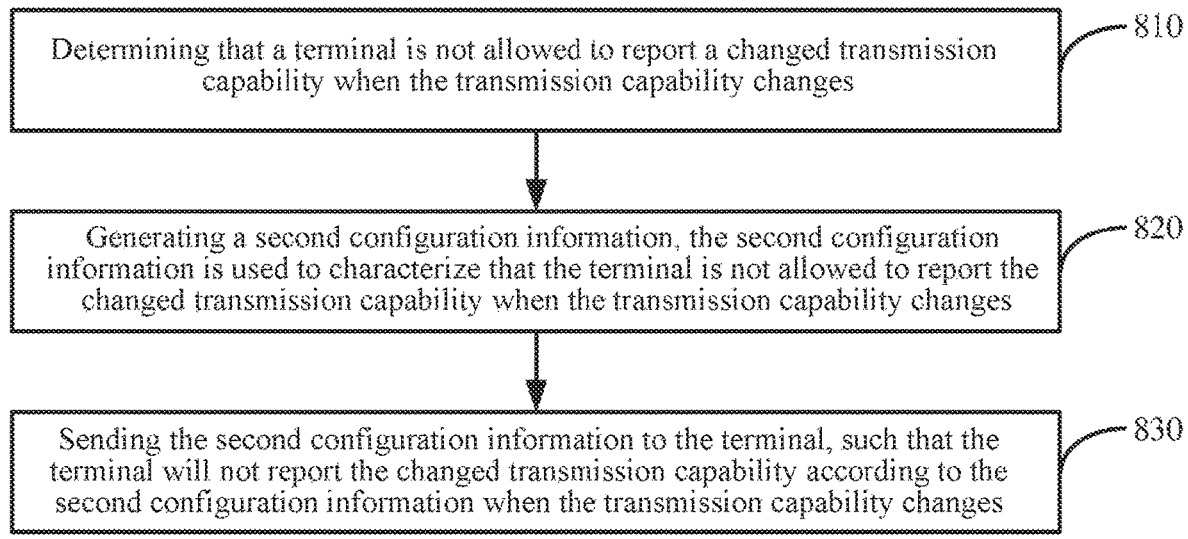
FIG. 8 is a flowchart illustrating another transmission configuration method according to some embodiments.

FIG. 8 is a flowchart illustrating another transmission configuration method according to some embodiments. This transmission configuration method can be applied to a base station. Based on the method shown in FIG. 1, as shown in FIG. 8, the transmission configuration method can further include the following steps 810-820.

In step 810, determining that the terminal is not allowed to report the changed transmission capability when the transmission capability changes.

In some embodiments of the present disclosure, the base station may determine whether to allow the terminal to report the changed transmission capability when the transmission capability changes according to the actual situation; in a case that allowed, it can generate corresponding first configuration information to inform the terminal, such that the terminal can learn that the base station allows to report the changed transmission capability according to the first configuration information; in a case that disallowed, it can generate corresponding second configuration information, such that the terminal can learn that the base station does not allow to report the changed transmission capability according to the second configuration information.

In step 820, generating the second configuration information, and the second configuration information is used to characterize that the terminal is not allowed to report the changed transmission capability when the transmission capability changes.

In step 830, sending the second configuration information to the terminal, such that the terminal will not report the changed transmission capability according to the second configuration information when the transmission capability changes.

As can be seen from the above described embodiment, when it is determined that the terminal is not allowed to report the changed transmission capability when the transmission capability changes, the second configuration information may be generated, the second configuration information is used to characterize that the terminal is not allowed to report the changed transmission capability when the transmission capability changes, the second configuration information is sent to the terminal, such that the changed transmission capability cannot be reported according to the second configuration information, thereby satisfying the individual needs of the base station that does not allow the terminal to report the changed transmission capability, and the application range of the transmission configuration is expanded.

Figure 9:
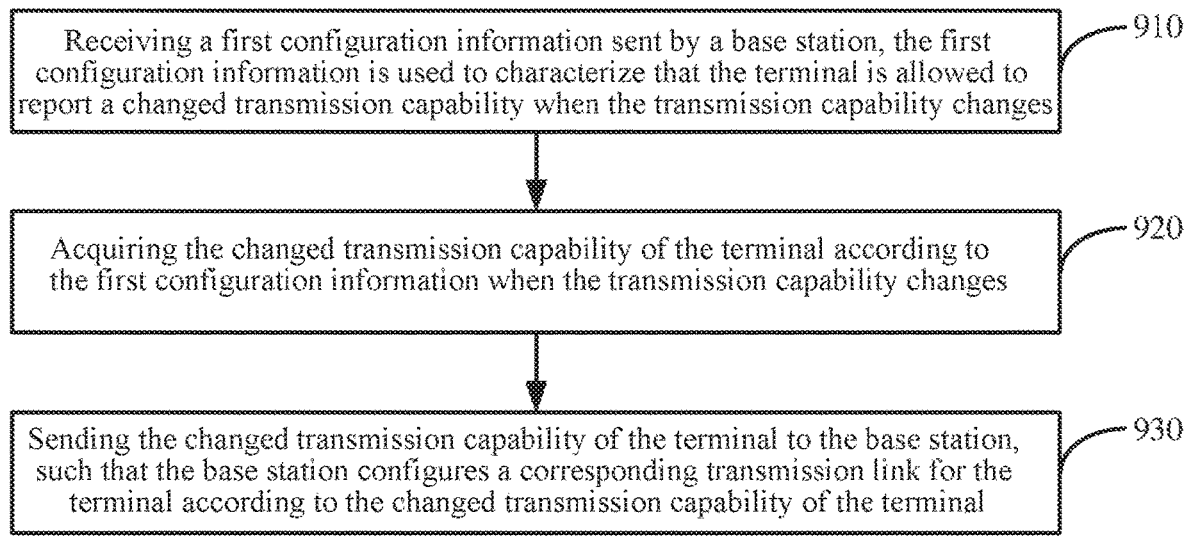
FIG. 9 is a flowchart illustrating a transmission configuration method according to some embodiments.

FIG. 9 is a flowchart illustrating a transmission configuration method according to some embodiments. The transmission configuration method may be applied to a terminal. As shown in FIG. 9, the transmission configuration method can include the following steps 910-930.

In step 910, receiving first configuration information sent by a base station, the first configuration information is used to characterize that a terminal is allowed to report a changed transmission capability when the transmission capability changes.

In step 920, acquiring the changed transmission capability of the terminal according to the first configuration information when the transmission capability changes.

In some embodiments of the present disclosure, the changed transmission capability of the terminal may be specified as: after the transmission capability of the terminal is changed, at least one of all frequency band combinations and channel combinations that the terminal can support without generating intermodulation interference.

In step 930, sending the changed transmission capability of the terminal to the base station, such that the base station configures a corresponding transmission link for the terminal according to the changed transmission capability of the terminal.

As can be seen from the above described embodiment, through receiving the first configuration information sent by the base station, the first configuration information is used to characterize that a terminal is allowed to report a changed transmission capability when the transmission capability changes. When the transmission capability changes, the changed transmission capability of the terminal is acquired according to the first configuration information, and the changed transmission capability of the terminal is sent to the base station, such that the base station can configure a corresponding transmission link for the terminal according to the changed transmission capability of the terminal, thereby improving data transmission quality and improving transmission resource utilization.

Figure 10:
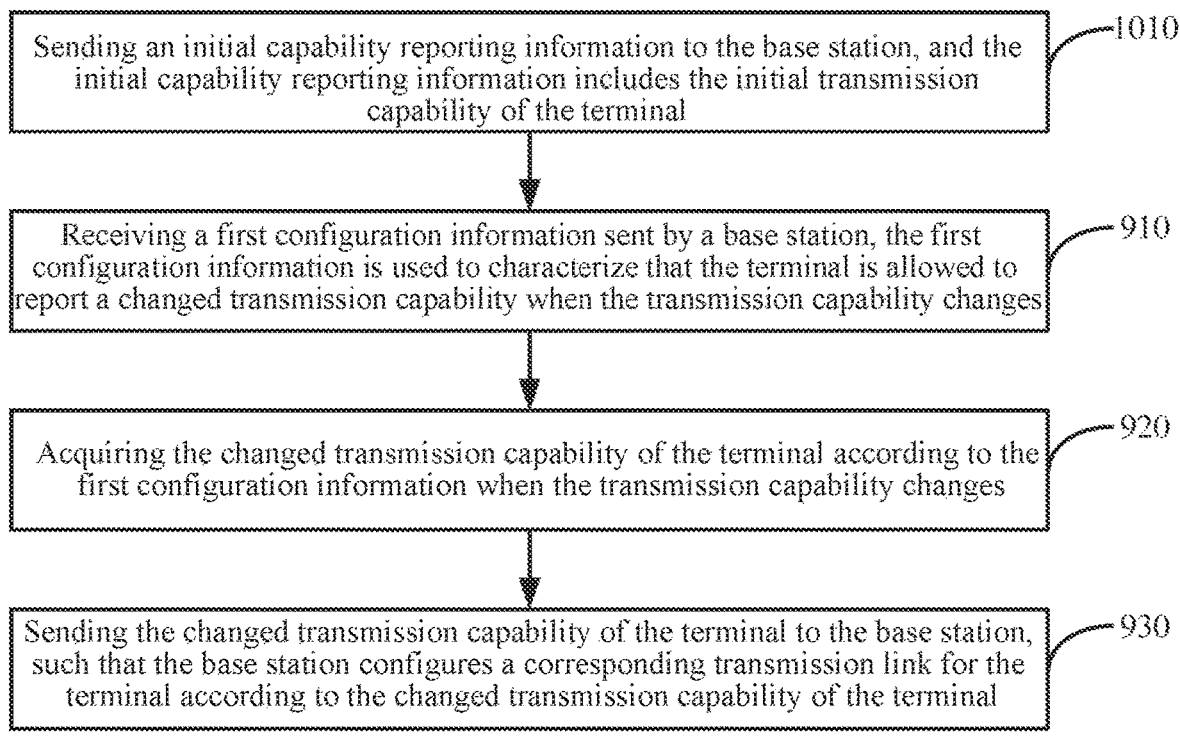
FIG. 10 is a flowchart illustrating another transmission configuration method according to some embodiments.

FIG. 10 is a flowchart illustrating another transmission configuration method according to some embodiments. This transmission configuration method can be applied to a base station. Based on the method shown in FIG. 9, as shown in FIG. 10, the transmission configuration method can further include the following step 1010.

In step 1010, sending initial capability reporting information to the base station, and the initial capability reporting information includes the initial transmission capability of the terminal.

As can be seen from the above described embodiment, through sending initial capability reporting information to a base station, such that facilitates the base station to determine whether to allow the terminal to report the changed transmission capability when the transmission capability changes according to the initial transmission capability of the terminal, thereby improving the reliability of transmission configuration.

In some embodiments, based on the method shown in FIG. 10, the initial transmission capability of the terminal in the above described step 1010 can include at least one of all frequency band combinations and channel combinations, and at least one of the all frequency band combinations and channel combinations can be supported by the terminal and do not generate intermodulation interference.

As can be seen from the above described embodiment, the initial transmission capability of the terminal sent to the base station can include at least one of all frequency band combinations and channel combinations that the terminal can support without generating intermodulation interference, such that the base station may fully understand all the wireless transmission capability of the terminal, which is helpful for the base station to determine whether the terminal is allowed to report the changed transmission capability when the transmission capability changes, thereby improving the accuracy of the transmission configuration.

Figure 11:
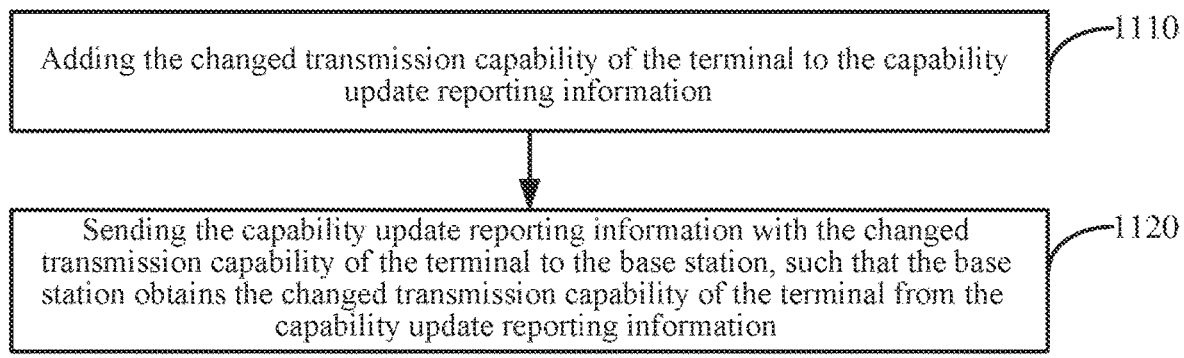
FIG. 11 is a flowchart illustrating another transmission configuration method according to some embodiments.

FIG. 11 is a flowchart illustrating another transmission configuration method according to some embodiments. The transmission configuration method can be applied to a base station, based on the method shown in FIG. 9, when step 930 is performed, the changed transmission capability of the terminal may be sent to the base station through capability update reporting information, as shown in FIG. 11, it can include the following steps 1110-1120.

In step 1110, adding the changed transmission capability of the terminal to the capability update reporting information.

In step 1120, sending the capability update reporting information with the changed transmission capability of the terminal to the base station, such that the base station obtains the changed transmission capability of the terminal from the capability update reporting information.

As can be seen from the above described embodiment, through adding the changed transmission capability of the terminal to the capability update reporting information, sending the capability update reporting information with the changed transmission capability of the terminal to the base station, such that the base station can directly obtain the changed transmission capability of the terminal from the capability update reporting information, thereby improving the transmission efficiency of the changed transmission capability of the terminal and also improving the transmission reliability of the changed transmission capability of the terminal.

Figure 12:
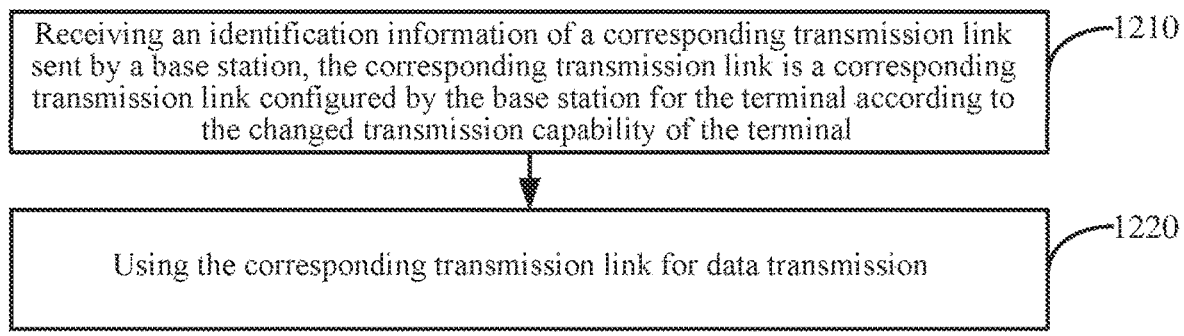
FIG. 12 is a flowchart illustrating another transmission configuration method according to some embodiments.

FIG. 12 is a flowchart illustrating another transmission configuration method according to some embodiments. This transmission configuration method can be applied to a base station. Based on the method shown in FIG. 9 or FIG. 11, as shown in FIG. 12, the transmission configuration method further includes the following steps 1210-1220.

In step 1210, receiving the identification information of the corresponding transmission link sent by the base station, and the corresponding transmission link is the corresponding transmission link configured by the base station for the terminal according to the changed transmission capability of the terminal.

In some embodiments of the present disclosure, the identification information is used to characterize a corresponding transmission link configured by the base station for the terminal.

In step 1220, using the corresponding transmission link to perform data transmission.

As can be seen from the above described embodiment, through receiving identification information of a corresponding transmission link sent by the base station, the corresponding transmission link is a corresponding transmission link configured by the base station for the terminal according to the changed transmission capability of the terminal. Data transmission is performed by using the corresponding transmission link, thereby the terminal can perform data transmission according to the transmission link newly configured by the base station, thereby improving data transmission quality and improving transmission resource utilization.

Figure 13:
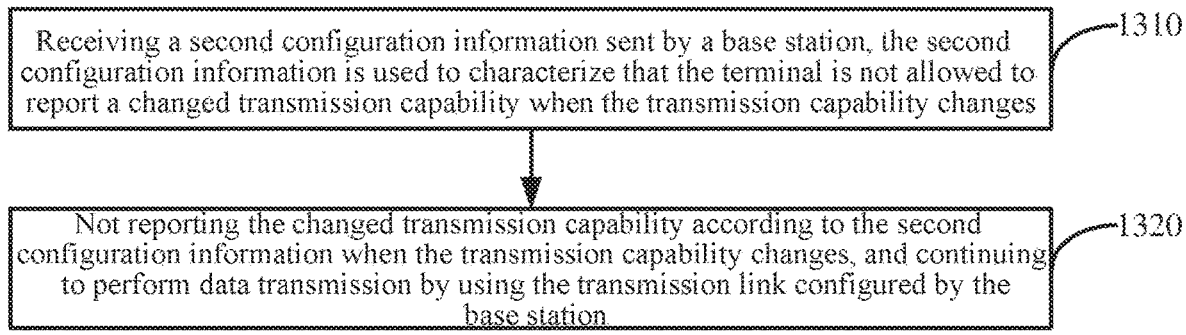
FIG. 13 is a flowchart illustrating another transmission configuration method according to some embodiments.

FIG. 13 is a flowchart illustrating another transmission configuration method according to some embodiments. The transmission configuration method may be applied to a base station. Based on the method shown in FIG. 9, as shown in FIG. 13, the transmission configuration method can further include the following steps 1310-1320.

In step 1310, receiving a second configuration information sent by a base station, the second configuration information is used to characterize that a terminal is not allowed to report a changed transmission capability when the transmission capability changes.

In step 1320, when the transmission capability changes, not reporting the changed transmission capability according to the second configuration information, and continuing to perform data transmission by using the transmission link configured by the base station.

For example, the transmission link configured by the base station may be a transmission link configured for the terminal according to the initial capability reporting information after the base station receives the initial capability reporting information sent by the terminal.

As can be seen from the above described embodiment, through receiving the second configuration information sent by the base station, the second configuration information is used to characterize that the terminal is not allowed to report the changed transmission capability when the transmission capability changes, when the transmission capability changes, not reporting the changed transmission capability according to the second configuration information, and continuing to perform data transmission by using the transmission link that has been configured by the base station, thereby meeting the individual needs of the base station that does not allow the terminal to report the changed transmission capability, and expanding the application range of the transmission configuration.

Corresponding to the above described embodiments of the transmission configuration method, the present disclosure also provides an embodiment of a transmission configuration apparatus.

Figure 14:
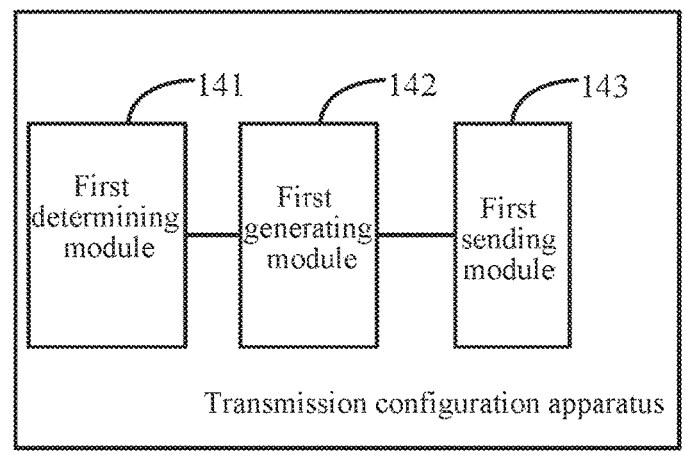
FIG. 14 is a block diagram illustrating a transmission configuration apparatus according to some embodiments.

FIG. 14 is a block diagram of a transmission configuration apparatus according to some embodiments. The apparatus is applied to a base station and used to execute the transmission configuration method shown in FIG. 1. As shown in FIG. 14, the transmission configuration apparatus can include:

a first determining module 141, configured to determine that the terminal is allowed to report the changed transmission capability when the transmission capability changes;

a first generating module 142, configured to generate first configuration information, the first configuration information is used to characterize that the terminal is allowed to report a changed transmission capability when the transmission capability changes;

a first sending module 143, configured to send the first configuration information to the terminal, such that when the transmission capability changes, the terminal obtains the changed transmission capability according to the first configuration information, and sends the changed transmission capability to the base station.

As can be seen from the above described embodiment, the first configuration information is generated by determining that the terminal is allowed to report the changed transmission capability when the transmission capability changes, the first configuration information is used to characterize that a terminal is allowed to report a changed transmission capability when the transmission capability changes, and the first configuration information is sent to the terminal. Such that the terminal can report its changed transmission capability with the allowance of the base station, without the need to update its own transmission capability information by the way of detaching or reattaching. Thereby the individual needs of the terminal for dynamically reporting the changed transmission capability is met, the service performance and user experience of the terminal are not affected, and the practicality of the transmission configuration is improved.

Figure 15:
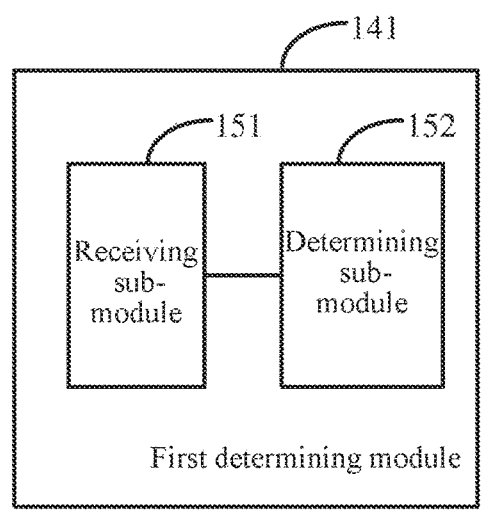
FIG. 15 is a block diagram illustrating another transmission configuration apparatus according to some embodiments.

In some embodiments, based on the apparatus shown in FIG. 14, as shown in FIG. 15, the first determining module 141 can include:

a receiving sub-module 151, configured to receive initial capability reporting information sent by the terminal, the initial capability reporting information includes an initial transmission capability of the terminal;

a determining sub-module 152, configured to determine that the terminal is allowed to report the changed transmission capability when the transmission capability changes according to the initial transmission capability of the terminal.

As can be seen from the above described embodiment, through receiving the initial capability reporting information sent by the terminal, the initial capability reporting information including the initial transmission capability of the terminal, and determining that the terminal is allowed to report the changed transmission capability when the transmission capability changes according to the initial transmission capability of the terminal, thereby improving the reliability of the transmission configuration.

In some embodiments, based on the apparatus shown in FIG. 15, the initial transmission capability of the terminal includes at least one of all frequency band combinations and channel combinations, and at least one of the all frequency band combinations and channel combinations can be supported by the terminal and do not generate intermodulation interference.

As can be seen from the above described embodiment, the initial transmission capability of the terminal can include at least one of all frequency band combinations and channel combinations that the terminal can support without generating intermodulation interference, such that convenient for the base station to fully understand all the wireless transmission capability of the terminal, which is helpful for the base station to determine whether the terminal is allowed to report the changed transmission capability when the transmission capability changes, thereby improving the accuracy of the transmission configuration.

Figure 16:
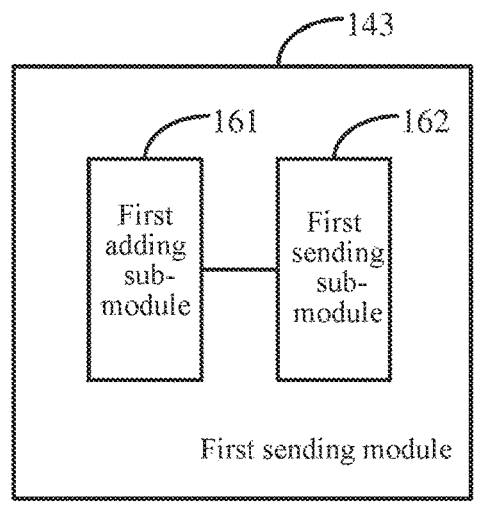
FIG. 16 is a block diagram illustrating another transmission configuration apparatus according to some embodiments.

In some embodiments, based on the apparatus shown in FIG. 14, as shown in FIG. 16, the first sending module 143 can include:

a first adding sub-module 161, configured to add the first configuration information to RRC signaling;

a first sending sub-module 162, configured to send the RRC signaling with the first configuration information to the terminal, such that the terminal obtains the first configuration information from the RRC signaling.

As can be seen from the above described embodiment, through adding the first configuration information to the RRC signaling, and sending the RRC signaling with the first configuration information to the terminal, such that the terminal can directly obtain the first configuration information from the RRC signaling, thereby enriching the transmission mode of the first configuration information and also improving the reliability of the first configuration information transmission.

Figure 17:
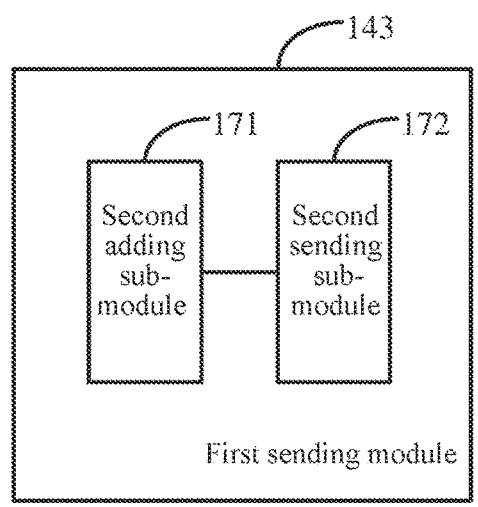
FIG. 17 is a block diagram illustrating another transmission configuration apparatus according to some embodiments.

In some embodiments, based on the apparatus shown in FIG. 14, as shown in FIG. 17, the first sending module 143 can include:

a second adding sub-module 171, configured to add the first configuration information to terminal auxiliary information signaling;

a second sending sub-module 172, configured to send the terminal auxiliary information signaling with the first configuration information to the terminal, such that the terminal obtains the first configuration information from the terminal auxiliary information signaling.

As can be seen from the above described embodiment, through adding the first configuration information to the terminal auxiliary information signaling, and sending the terminal auxiliary information signaling with the first configuration information to the terminal, making the terminal obtain the first configuration information from the terminal auxiliary information, such that the terminal can directly obtain the first configuration information from the terminal auxiliary information signaling, thereby enriching the transmission mode of the first configuration information and also improving the reliability of the first configuration information transmission.

In some embodiments, based on any one of the apparatuses shown above, as shown in FIG. 18, the transmission configuration apparatus may further include:

a reporting information receiving module 181, configured to receive the capability update reporting information sent by the terminal, and the capability update reporting information includes the changed transmission capability of the terminal;

a transmission link configuration module 182, configured to configure a corresponding transmission link for the terminal according to the changed transmission capability of the terminal;

a transmission link sending module 183, configured to send the identification information of the corresponding transmission link to the terminal.

As can be seen from the above described embodiment, through receiving the capability update reporting information sent by the terminal, the capability update reporting information includes the changed transmission capability of the terminal, configuring a corresponding transmission link for the terminal according to the changed transmission capability of the terminal, and sending identification information of the corresponding transmission link to the terminal, such that the terminal can perform data transmission according to the transmission link newly configured by the base station, thereby improving data transmission quality and also improving transmission resource utilization.

Figure 18:
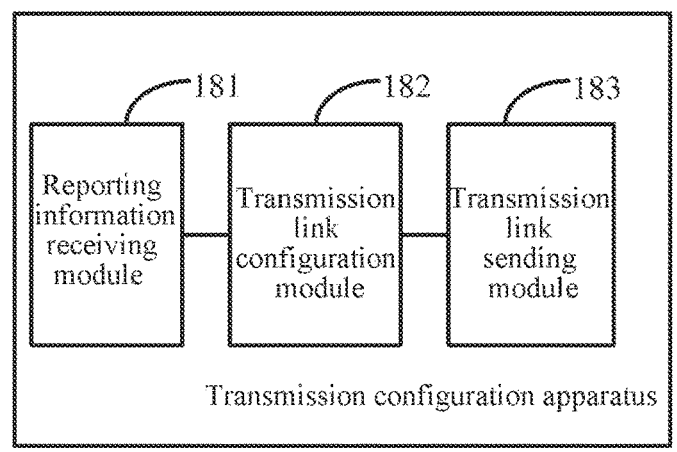
FIG. 18 is a block diagram illustrating another transmission configuration apparatus according to some embodiments.
Figure 19:
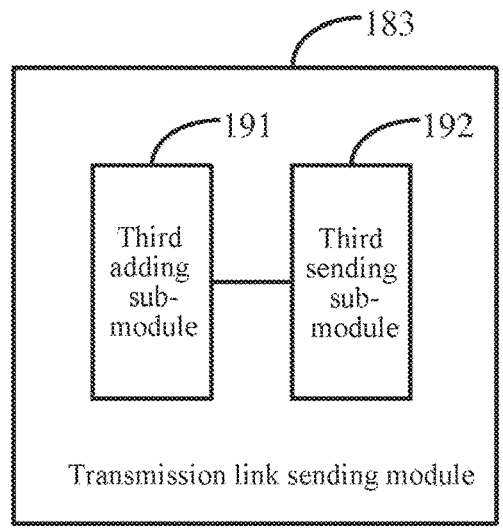
FIG. 19 is a block diagram illustrating another transmission configuration apparatus according to some embodiments.

In some embodiments, based on the apparatus shown in FIG. 18, as shown in FIG. 19, the transmission link sending module 183 can include:

a third adding sub-module 191, configured to add the identification information of the corresponding transmission link to the wireless resource configuration information;

a third sending sub-module 192, configured to send the wireless resource configuration information with the identification information of the corresponding transmission link to the terminal, such that the terminal obtains the identification information of the corresponding transmission link from the wireless resource configuration information.

As can be seen from the above described embodiment, through adding the identification information of the corresponding transmission link to the wireless resource configuration information, and sending the wireless resource configuration information with the identification information of the corresponding transmission link to the terminal, such that the terminal can directly obtain the identification information of the corresponding transmission link from the wireless resource configuration information, and then use the corresponding transmission link configured by the base station to perform data transmission, thereby improving the efficiency of transmission configuration.

Figure 20:
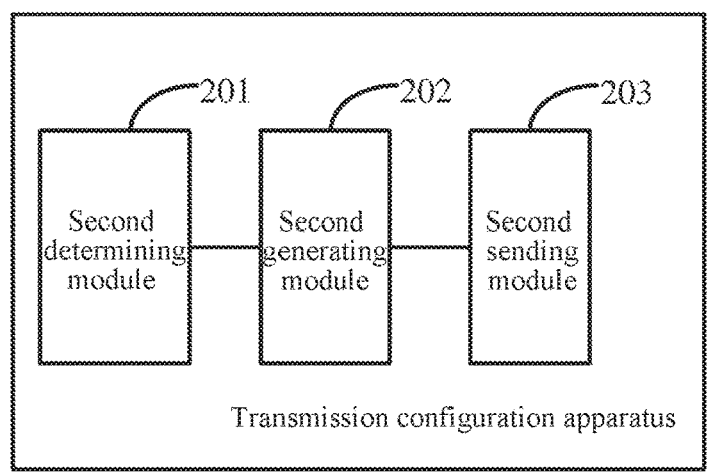
FIG. 20 is a block diagram illustrating another transmission configuration apparatus according to some embodiments.

In some embodiments, based on the apparatuses shown in FIG. 14, as shown in FIG. 20, the transmission configuration apparatus may further include:

a second determining module 201, configured to determine that the terminal is not allowed to report the changed transmission capability when the transmission capability changes;

a second generating module 202, configured to generate a second configuration information, the second configuration information is used to characterize that the terminal is not allowed to report a changed transmission capability when the transmission capability changes;

a second sending module 203, configured to send the second configuration information to the terminal, such that when the transmission capability changes, the terminal does not report the changed transmission capability according to the second configuration information.

As can be seen from the above described embodiment, when it is determined that the terminal is not allowed to report the changed transmission capability when the transmission capability changes, the second configuration information may be generated, the second configuration information is used to characterize that the terminal is not allowed to report the changed transmission capability when the transmission capability changes, and the second configuration information is sent to the terminal, such that the changed transmission capability cannot be reported according to the second configuration information, thereby satisfying the individual needs of the base station that does not allow the terminal to report the changed transmission capability, and the application range of the transmission configuration is expanded.

Figure 21:
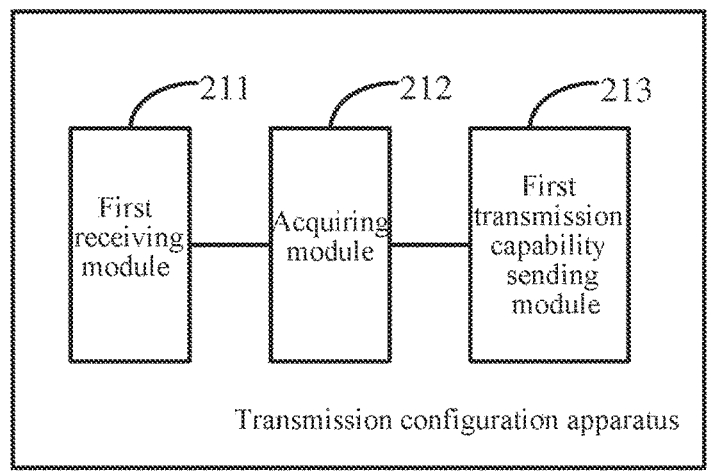
FIG. 21 is a block diagram illustrating a transmission configuration apparatus according to some embodiments.

FIG. 21 is a block diagram illustrating a transmission configuration apparatus according to some embodiments. The apparatus is applied to a base station and used to execute the transmission configuration method shown in FIG. 9. As shown in FIG. 21, the transmission configuration apparatus can include:

a first receiving module 211, configured to receive first configuration information sent by a base station, the first configuration information is used to characterize that a terminal is allowed to report a changed transmission capability when the transmission capability changes;

an acquiring module 212, configured to acquire the changed transmission capability of the terminal according to the first configuration information when the transmission capability changes;

A first transmission capability sending module 213, configured to send the changed transmission capability of the terminal to the base station, such that the base station configures a corresponding transmission link for the terminal according to the changed transmission capability of the terminal.

As can be seen from the above described embodiment, through receiving the first configuration information sent by the base station, the first configuration information is used to characterize that a terminal is allowed to report a changed transmission capability when the transmission capability changes. When the transmission capability changes, the changed transmission capability of the terminal is acquired according to the first configuration information, and the changed transmission capability of the terminal is sent to the base station, such that the base station can configure a corresponding transmission link for the terminal according to the changed transmission capability of the terminal, thereby improving data transmission quality and improving transmission resource utilization.

Figure 22:
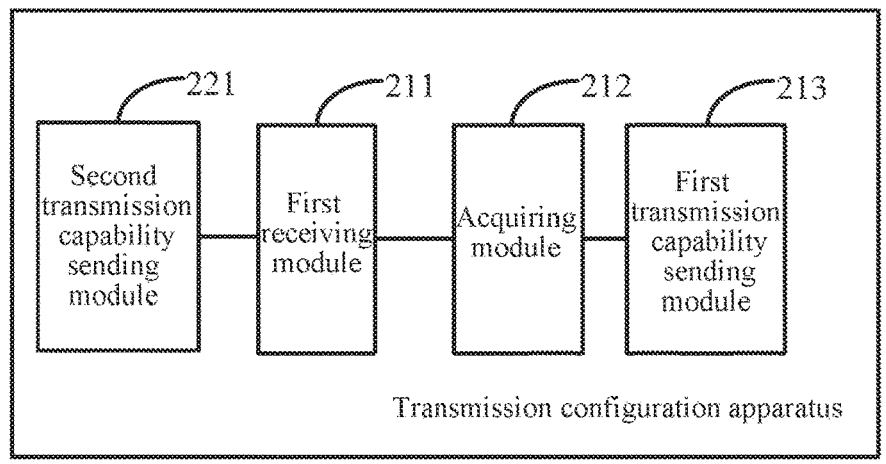
FIG. 22 is a block diagram illustrating another transmission configuration apparatus according to some embodiments.

In some embodiments, based on the apparatuses shown in FIG. 21, as shown in FIG. 22, the transmission configuration apparatus may further include:

a second transmission capability sending module 221, configured to send initial capability reporting information to the base station, and the initial capability reporting information includes an initial transmission capability of the terminal.

As can be seen from the above described embodiment, through sending initial capability reporting information to a base station, such that facilitates the base station to determine whether to allow the terminal to report the changed transmission capability when the transmission capability changes according to the initial transmission capability of the terminal, thereby improving the reliability of transmission configuration.

In some embodiments, based on the apparatus shown in FIG. 22, the initial transmission capability of the terminal includes at least one of all frequency band combinations and channel combinations, and at least one of the all frequency band combinations and channel combinations can be supported by the terminal and do not generate intermodulation interference.

As can be seen from the above described embodiment, the initial transmission capability of the terminal sent to the base station can include at least one of all frequency band combinations and channel combinations that the terminal can support without generating intermodulation interference, such that may convenient for the base station to fully understand all the wireless transmission capability of the terminal, which is helpful for the base station to determine whether the terminal is allowed to report the changed transmission capability when the transmission capability changes, thereby improving the accuracy of the transmission configuration.

Figure 23:
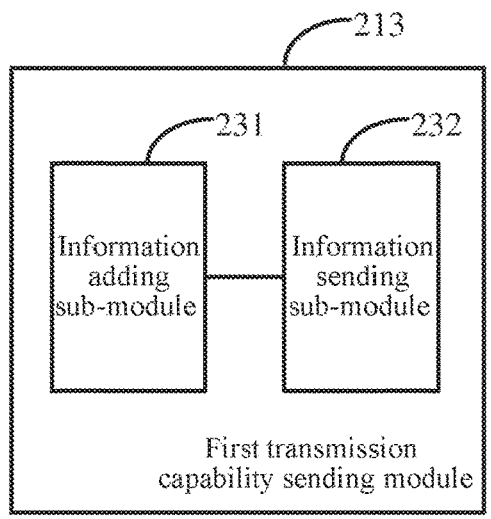
FIG. 23 is a block diagram illustrating another transmission configuration apparatus according to some embodiments.

In some embodiments, based on the apparatus shown in FIG. 21, as shown in FIG. 23, the first transmission capability sending module 213 can include:

an information adding sub-module 231, configured to add the changed transmission capability of the terminal to the capability update reporting information;

an information sending sub-module 232, configured to send the capability update reporting information with the changed transmission capability of the terminal to the base station, such that the base station obtains the changed transmission capability of the terminal from the capability update reporting information.

As can be seen from the above described embodiment, through adding the changed transmission capability of the terminal to the capability update reporting information, sending the capability update reporting information with the changed transmission capability of the terminal to the base station, such that the base station can directly obtain the changed transmission capability of the terminal from the capability update reporting information, thereby improving the transmission efficiency of the changed transmission capability of the terminal and also improving the transmission reliability of the changed transmission capability of the terminal.

Figure 24:
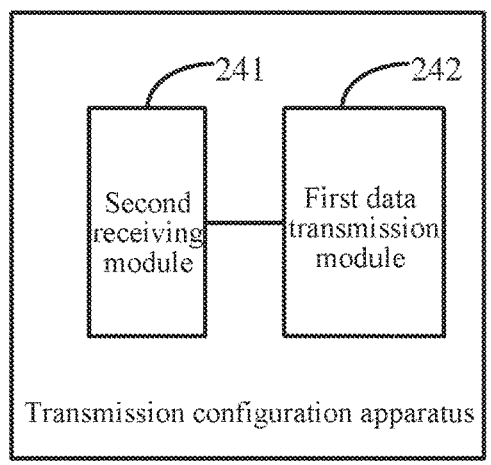
FIG. 24 is a block diagram illustrating another transmission configuration apparatus according to some embodiments.

In some embodiments, based on the apparatuses shown in FIG. 21 or FIG. 23, as shown in FIG. 24, the transmission configuration apparatus may further include:

a second receiving module 241, configured to receive identification information of the corresponding transmission link sent by the base station, the corresponding transmission link is a corresponding transmission link configured by the base station for the terminal according to the changed transmission capability of the terminal;

a first data transmission module 242, configured to perform data transmission by using the corresponding transmission link.

As can be seen from the above described embodiment, through receiving identification information of a corresponding transmission link sent by the base station, the corresponding transmission link is a corresponding transmission link configured by the base station for the terminal according to the changed transmission capability of the terminal. Data transmission is performed by using the corresponding transmission link, such that the terminal can perform data transmission according to the transmission link newly configured by the base station, thereby improving data transmission quality and improving transmission resource utilization.

Figure 25:
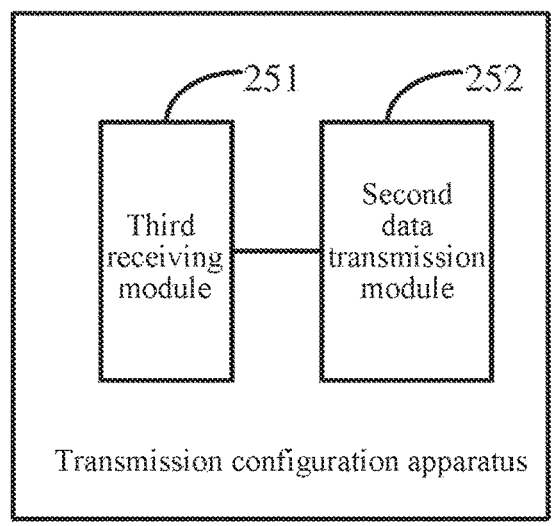
FIG. 25 is a block diagram illustrating another transmission configuration apparatus according to some embodiments.

In some embodiments, based on the apparatuses shown in FIG. 21, as shown in FIG. 25, the transmission configuration apparatus can further include:

a third receiving module 251, configured to receive a second configuration information sent by a base station, the second configuration information is used to characterize that a terminal is not allowed to report a changed transmission capability when the transmission capability changes;

a second data transmission module 252, configured to not report the changed transmission capability according to the second configuration information when the transmission capability changes, and continue to use the transmission link configured by the base station for data transmission.

As can be seen from the above described embodiments, through receiving the second configuration information sent by the base station, the second configuration information is used to characterize that the terminal is not allowed to report the changed transmission capability when the transmission capability changes, when the transmission capability changes, not reporting the changed transmission capability according to the second configuration information, and continuing to perform data transmission by using the transmission link that has been configured by the base station, thereby meeting the individual needs of the base station that does not allow the terminal to report the changed transmission capability, and expanding the application range of the transmission configuration.

For the apparatus embodiments, since it basically corresponds to the method embodiment, the correlation can be referred to the partial description of the method embodiment. The apparatus embodiments described above are merely illustrative, the units described above as separate components may or may not be physically separated. The component displayed as a unit may or may not be a physical unit. That is, it can be located in one place, or it can be distributed to multiple network units. Some or all of the modules may be selected according to actual needs to achieve the objectives of the present disclosure scheme. Those skilled in the art can understand and implement without inventive effort.

Various embodiments of the present disclosure further provide a non-transitory computer readable storage medium on which a computer program is stored, and the computer program is configured to execute the transmission configuration method described in any one of FIG. 1 to FIG. 8 described above.

Various embodiments of the present disclosure further provide a non-transitory computer readable storage medium on which a computer program is stored, and the computer program is configured to execute the transmission configuration method described in any one of FIG. 9 to FIG. 13 described above.

Various embodiments of the present disclosure further provide a transmission configuration apparatus, and the apparatus is applied to a base station, and the apparatus includes:

a processor;

memory for storing executable instructions of the processor;

In some embodiments, the processor is configured to:

determine whether to allow the terminal to report the changed transmission capability when the transmission capability changes;

generate a first configuration information, the first configuration information is used to characterize that the terminal is allowed to report a changed transmission capability when the transmission capability changes;

send the first configuration information to the terminal, such that when the transmission capability changes, the terminal obtains the changed transmission capability according to the first configuration information, and send the changed transmission capability to the base station.

Figure 26:
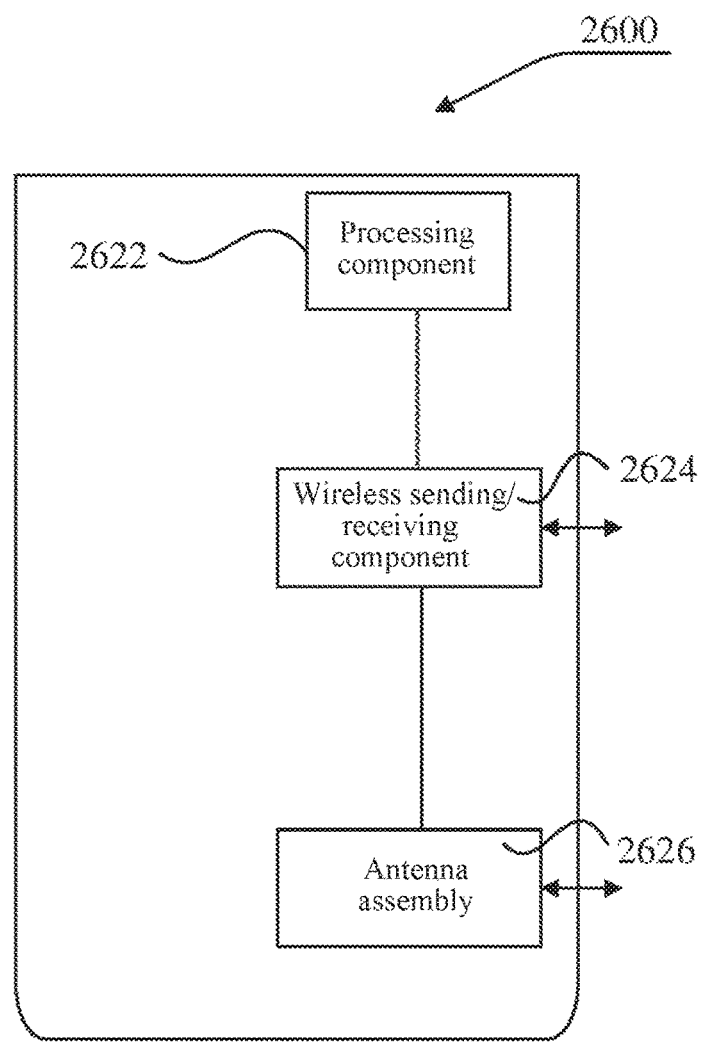
FIG. 26 is a structural diagram illustrating a transmission configuration apparatus according to some embodiments.

As shown in FIG. 26, FIG. 26 is a structural diagram of a transmission configuration apparatus according to some embodiments. The apparatus 2600 can be provided as a base station. Referring to FIG. 26, apparatus 2600 includes a processing component 2622, a wireless sending/receiving component 2624, an antenna component 2626, and a signal processing portion specific to the wireless interface. The processing component 2622 can further include one or more processors.

One of the processors in the processing component 2622 may be configured to perform any one of the transmission configuration methods described above.

Various embodiments of the present disclosure further provide a configuration apparatus of a communication link, and the apparatus is applied to a terminal, and the apparatus includes:

a processor;

memory for storing executable instructions of the processor;

In some embodiments, the processor is configured to:

receive first configuration information sent by a base station, the first configuration information is used to characterize that a terminal is allowed to report a changed transmission capability when the transmission capability changes;

when the transmission capability changes, acquire the changed transmission capability of the terminal according to the first configuration information;

send the changed transmission capability of the terminal to the base station, such that the base station configures a corresponding transmission link for the terminal according to the changed transmission capability of the terminal.

Figure 27:
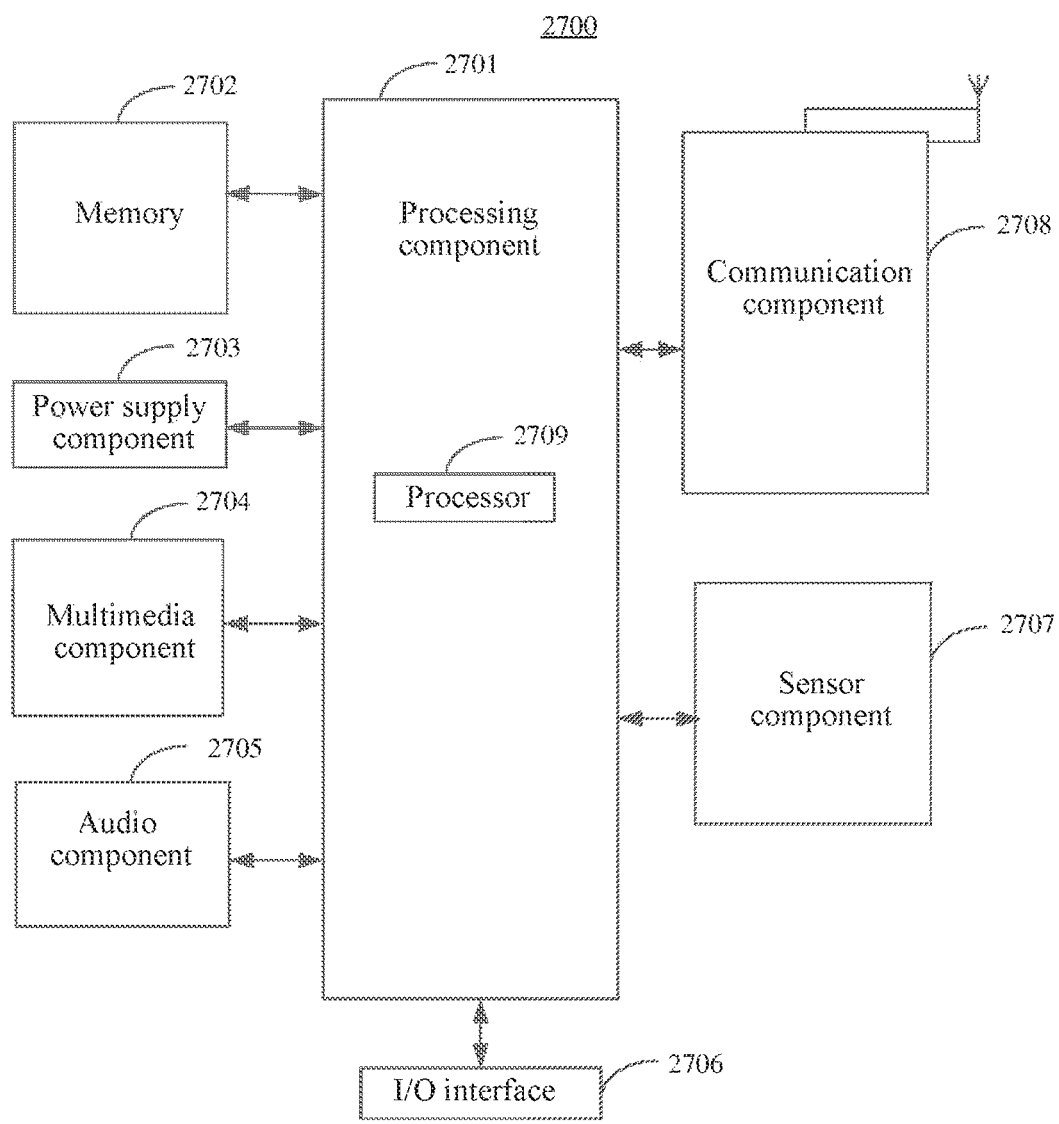
FIG. 27 is a structural diagram illustrating a transmission configuration apparatus according to some embodiments.

FIG. 27 is a structural diagram of a transmission configuration apparatus according to some embodiments. As shown in FIG. 27, a transmission configuration apparatus 2700 is shown according to some embodiments. The apparatus 2700 may be a terminal such as a computer, a mobile phone, a digital broadcasting terminal, a message send-receive device, a game console, a tablet device, a medical device, a fitness device, a personal digital assistant, and the like.

Referring to FIG. 27, the apparatus 2700 can include one or more of the following components: a processing component 2701, a memory 2702, a power supply component 2703, a multimedia component 2704, an audio component 2705, an input/output (I/O) interface 2706, a sensor component 2707, and a communication component 2708.

The processing component 2701 generally controls the overall operations of the apparatus 2700, such as operations associated with display, telephone calls, data communications, camera operations, and recording operations. The processing component 2701 can include one or more processors 2709 to execute instructions to complete all or part of the steps of the method described above. In addition, the processing component 2701 can include one or more modules to facilitate interaction between the processing component 2701 and other components. For example, the processing component 2701 can include a multimedia module to facilitate the interaction between the multimedia component 2704 and the processing component 2701.

The memory 2702 is configured to store various types of data to support operation at the apparatus 2700. Examples of such data include instructions for any application or method for operating on the apparatus 2700, contact data, phone book data, messages, pictures, videos, and the like. The memory 2702 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 2703 provides power to various components of the apparatus 2700. The power component 2703 can include a power management system, one or more power sources, and other components associated with generating, managing, and distributing power for the apparatus 2700.

The multimedia component 2704 includes a screen that provides an output interface between the apparatus 2700 and a user. In some embodiments, the screen can include a liquid crystal display (LCD) and a touch panel (TP). In some embodiments, an organic light-emitting diode (OLED) display can be employed. If the screen includes a touch panel, the screen may be implemented as a touch screen to receive an input signal from a user. The touch panel includes one or more touch sensors to sense touch, swipe, and gestures on the touch panel. The touch sensor may not only sense a boundary of a touch or slide action, but also detect duration and pressure related to the touch or slide operation. In some embodiments, the multimedia component 2704 includes at least one of a front camera and a rear camera. When the apparatus 2700 is in an operation mode, such as a shooting mode or a video mode, at least one of the front camera and the rear camera can receive external multimedia data. Each front camera and rear camera can be a fixed optical lens system or have focal length and optical zoom capabilities.

The audio component 2705 is configured to output and/or input audio signals. For example, the audio component 2705 includes a microphone (MIC). When the apparatus 2700 is in an operation mode, such as a call mode, a recording mode, and a voice recognition mode, the microphone is configured to receive an external audio signal. The received audio signal may be further stored in the memory 2702 or transmitted via the communication component 2708. In some embodiments, the audio component 2705 further includes a speaker for outputting an audio signal.

The I/O interface 2706 provides an interface between the processing component 2701 and a peripheral interface module. The above peripheral interface module may be a keyboard, a click wheel, buttons, or the like. These buttons may include, but are not limited to: a home button, a volume button, a start button, and a lock button.

The sensor component 2707 includes one or more sensors for providing status evaluation of various aspects to the apparatus 2700. For example, the sensor component 2707 can detect the on/off state of the apparatus 2700 and the relative positioning of the components, such as the display and keypad of the apparatus 2700. The sensor component 2707 can also detect a change in the position of the apparatus 2700 or a component of the apparatus 2700, the presence or absence of a user's contact with the apparatus 2700, the orientation or acceleration/deceleration of the apparatus 2700, and the temperature change of the apparatus 2700. The sensor component 2707 can include a proximity sensor configured to detect the presence of nearby objects when there is not any physical contact. The sensor component 2707 may also include a light sensor, such as a CMOS or CCD image sensor, for use in imaging applications. In some embodiments, the sensor component 2707 may further include an acceleration sensor, a gyroscope sensor, a magnetic sensor, a pressure sensor, or a temperature sensor.

The communication component 2708 is configured to facilitate wired or wireless communication between the apparatus 2700 and other devices. The apparatus 2700 can access a wireless network based on a communication standard, such as Wi-Fi, 2G, 3G, 4G, or 5G, or a combination thereof. In some embodiments, the communication component 2708 receives a broadcast signal or broadcast-related information from an external broadcast management system via a broadcast channel. In some embodiments, the communication component 2708 further includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

In some embodiments, the apparatus 2700 may be implemented by one or more application-specific integrated circuits (ASIC), digital signal processors (DSP), digital signal processing devices (DSPD), programmable logic device (PLD), field programmable gate array (FPGA), controller, microcontroller, microprocessors, or other electronic components, and used to perform the above method.

In some embodiments, a non-transitory computer readable storage medium including instructions, such as a memory 2702 including instructions, may be provided, the above described instructions may be executed by the processor 2709 of the apparatus 2700 to complete the above described method. For example, the non-transitory computer-readable storage medium may be a ROM, a random access memory (RAM), a CD-ROM, a magnetic tape, a floppy disk, an optical data storage device, and the like.

In some embodiments, when the instructions in the storage medium are executed by the processor, such that the apparatus 2700 is enabled to execute any one of the above described transmission configuration methods.

In some embodiments, the determining that a terminal is allowed to report a changed transmission capability when the transmission capability changes includes:
receiving an initial capability reporting information sent by the terminal, the initial capability reporting information includes an initial transmission capability of the terminal;
determining that the terminal is allowed to report the changed transmission capability when the transmission capability changes according to the initial transmission capability of the terminal.

In some embodiments, the initial transmission capability of the terminal includes all frequency band combinations and/or channel combinations that the terminal can support without generating intermodulation interference.

In some embodiments, the sending the first configuration information to the terminal includes:
adding the first configuration information to a wireless resource control RRC signaling;
sending the RRC signaling with the first configuration information to the terminal, such that the terminal obtains the first configuration information from the RRC signaling.

In some embodiments, the sending the first configuration information to the terminal includes:
adding the first configuration information to a terminal auxiliary information signaling;
sending the terminal auxiliary information signaling with the first configuration information to the terminal, such that the terminal obtains the first configuration information from the terminal auxiliary information signaling.

In some embodiments, the method further includes:
receiving a capability update reporting information sent by the terminal, the capability update reporting information includes the changed transmission capability of the terminal;
configuring a corresponding transmission link for the terminal according to the changed transmission capability of the terminal;
sending an identification information of the corresponding transmission link to the terminal.

In some embodiments, the sending the identification information of the corresponding transmission link to the terminal includes:
adding the identification information of the corresponding transmission link to a wireless resource configuration information;
sending the wireless resource configuration information with the identification information of the corresponding transmission link to the terminal, such that the terminal obtains the identification information of the corresponding transmission link from the wireless resource configuration information.

In some embodiments, the method further includes:
determining that the terminal is not allowed to report the changed transmission capability when the transmission capability changes;
generating a second configuration information, the second configuration information is used to characterize that the terminal is not allowed to report the changed transmission capability when the transmission capability changes;
sending the second configuration information to the terminal, such that when the transmission capability changes, the terminal does not report the changed transmission capability according to the second configuration information.

In some embodiments, the method further includes:
sending an initial capability reporting information to the base station, the initial capability reporting information includes an initial transmission capability of the base station.

In some embodiments, the initial transmission capability of the terminal includes all frequency band combinations and/or channel combinations that the terminal can support without generating intermodulation interference.

In some embodiments, the sending the changed transmission capability of the terminal to the base station includes:
adding the changed transmission capability of the terminal to a capability update reporting information;
sending the capability update reporting information with the changed transmission capability of the terminal to the base station, such that the base station obtains the changed transmission capability of the terminal from the capability update reporting information.

In some embodiments, the method further includes:

receiving an identification information of the corresponding transmission link sent by the base station, the corresponding transmission link is a corresponding transmission link configured by the base station for the terminal according to the changed transmission capability of the terminal;

using the corresponding transmission link to perform data transmission.

In some embodiments, the method further includes:

receiving a second configuration information sent by the base station, the second configuration information is used to characterize that the terminal is not allowed to report the changed transmission capability when the transmission capability changes;

not reporting the changed transmission capability according to the second configuration information when the transmission capability changes, and continuing to perform data transmission by using a transmission link configured by the base station.

In an aspect, a transmission configuration apparatus is provided, the apparatus is applied to a base station, and the apparatus includes:

a first determining module, configured to determine that a terminal is allowed to report a changed transmission capability when the transmission capability changes;

a first generating module, configured to generate a first configuration information, the first configuration information is used to characterize that the terminal is allowed to report the changed transmission capability when the transmission capability changes;

a first sending module, configured to send the first configuration information to the terminal, such that when the transmission capability changes, the terminal obtains the changed transmission capability according to the first configuration information, and sends the changed transmission capability to the base station.

In some embodiments, the first determining module includes:

a receiving sub-module, configured to receive an initial capability reporting information sent by the terminal, the initial capability reporting information includes an initial transmission capability of the terminal;

a determining sub-module, configured to determine that the terminal is allowed to report the changed transmission capability when the transmission capability changes according to the initial transmission capability of the terminal.

In some embodiments, the initial transmission capability of the terminal includes all frequency band combinations and/or channel combinations that the terminal can support without generating intermodulation interference.

In some embodiments, the first sending module includes:

a first adding sub-module, configured to add the first configuration information to an RRC signaling;

a first sending sub-module, configured to send the RRC signaling with the first configuration information to the terminal, such that the terminal obtains the first configuration information from the RRC signaling.

In some embodiments, the first configuration information sending module includes:

a second adding sub-module, configured to add the first configuration information to a terminal auxiliary information signaling;

a second sending sub-module, configured to send the terminal auxiliary information signaling with the first configuration information to the terminal, such that the terminal obtains the first configuration information from the terminal auxiliary information signaling.

In some embodiments, the apparatus further includes:

a reporting information receiving module, configured to receive a capability update reporting information sent by the terminal, and the capability update reporting information includes the changed transmission capability of the terminal;

a transmission link configuration module, configured to configure a corresponding transmission link for the terminal according to the changed transmission capability of the terminal;

a transmission link sending module, configured to send an identification information of the corresponding transmission link to the terminal.

In some embodiments, the transmission link sending module includes:

a third adding sub-module, configured to add the identification information of the corresponding transmission link to a wireless resource configuration information;

a third sending sub-module, configured to send the wireless resource configuration information with the identification information of the corresponding transmission link to the terminal, such that the terminal obtains the identification information of the corresponding transmission link from the wireless resource configuration information.

In some embodiments, the apparatus further includes:

a second determining module, configured to determine that the terminal is not allowed to report the changed transmission capability when the transmission capability changes;

a second generating module, configured to generate a second configuration information, the second configuration information is used to characterize that the terminal is not allowed to report the changed transmission capability when the transmission capability changes;

a second sending module, configured to send the second configuration information to the terminal, such that when the transmission capability changes, the terminal does not report the changed transmission capability according to the second configuration information.

In another aspect, a transmission configuration apparatus is provided, the apparatus is applied to a terminal, and the apparatus includes:

a first receiving module, configured to receive a first configuration information sent by a base station, the first configuration information is used to characterize that a terminal is allowed to report a changed transmission capability when the transmission capability changes;

an acquiring module, configured to acquire the changed transmission capability of the terminal according to the first configuration information when the transmission capability changes; and a first transmission capability sending module, configured to send the changed transmission capability of the terminal to the base station, such that the base station configures a corresponding transmission link for the terminal according to the changed transmission capability of the terminal.

In some embodiments, the apparatus further includes:

a second transmission capability sending module, configured to send an initial capability reporting information to the base station, and the initial capability reporting information includes an initial transmission capability of the terminal.

In some embodiments, the initial transmission capability of the terminal includes all frequency band combinations and/or channel combinations that the terminal can support without generating intermodulation interference.

In some embodiments, the first transmission capability sending module includes:

an information adding sub-module, configured to add the changed transmission capability of the terminal to a capability update reporting information;

an information sending sub-module, configured to send the capability update reporting information with the changed transmission capability of the terminal to the base station, such that the base station obtains the changed transmission capability of the terminal from the capability update reporting information.

In some embodiments, the apparatus further includes:

a second receiving module, configured to receive an identification information of the corresponding transmission link sent by the base station, the corresponding transmission link is a corresponding transmission link configured by the base station for the terminal according to the changed transmission capability of the terminal;

a first data transmission module, configured to perform data transmission by using the corresponding transmission link.

In some embodiments, the apparatus further includes:

a third receiving module, configured to receive a second configuration information sent by the base station, the second configuration information is used to characterize that the terminal is not allowed to report the changed transmission capability when the transmission capability changes;

a second data transmission module, configured to not report the changed transmission capability according to the second configuration information when the transmission capability changes, and continue to use a transmission link configured by the base station for data transmission.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In another aspect, a non-transitory computer readable storage medium is provided, on which a computer program is stored, the computer program is configured to execute the transmission configuration methods described above.

In another aspect, a transmission configuration apparatus is provided, the apparatus is applied to a base station, and the apparatus includes:

a processor;

memory, configured to store executable instructions of the processor;

where the processor is configured to:

determine that a terminal is allowed to report a changed transmission capability when the transmission capability changes;

generate a first configuration information, the first configuration information is used to characterize that the terminal is allowed to report the changed transmission capability when the transmission capability changes;

send the first configuration information to the terminal, such that when the transmission capability changes, the terminal obtains the changed transmission capability according to the first configuration information, and sends the changed transmission capability to the base station.

Various embodiments of the present disclosure can have one or more of the following advantages.

The base station can generate the first configuration information by determining that the terminal is allowed to report the changed transmission capability when the transmission capability changes, the first configuration information is used to characterize that the terminal is allowed to report a changed transmission capability when the transmission capability changes, and the first configuration information is sent to the terminal. As such, the terminal can report its changed transmission capability with the allowance of the base station without the need to update its own transmission capability information by detaching or reattaching manner. Therefore, the individual needs of the terminal for dynamically reporting the changed transmission capability is met, the service performance and user experience of the terminal are not affected, and the practicality of the transmission configuration is improved.

The terminal according to various embodiments the present disclosure can receive first configuration information sent by a base station, the first configuration information is used to characterize that a terminal is allowed to report a changed transmission capability when the transmission capability changes. When the transmission capability changes, the changed transmission capability of the terminal is acquired according to the first configuration information, and the changed transmission capability of the terminal is sent to the base station, such that the base station can configure a corresponding transmission link for the terminal according to the changed transmission capability of the terminal, thereby improving data transmission quality and improving transmission resource utilization.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A transmission configuration method, applied to a base station, comprising:
    determining that a terminal is allowed to report a changed transmission capability when a transmission capability changes;
    generating a first configuration information, the first configuration information characterizing that the terminal is allowed to report the changed transmission capability when the transmission capability changes;
    sending the first configuration information to the terminal, such that when the transmission capability changes, the terminal obtains the changed transmission capability according to the first configuration information and sends the changed transmission capability to the base station;
    determining that the terminal is not allowed to report the changed transmission capability when the transmission capability changes;
    generating a second configuration information, the second configuration information is used to characterize that the terminal is not allowed to report the changed transmission capability when the transmission capability changes; and
    sending the second configuration information to the terminal, such that when the transmission capability changes, the terminal does not report the changed transmission capability according to the second configuration information.

2. The method according to claim 1, wherein the determining that a terminal is allowed to report a changed transmission capability when a transmission capability changes comprises:
    receiving an initial capability reporting information sent by the terminal, the initial capability reporting information comprises an initial transmission capability of the terminal; and
    determining that the terminal is allowed to report the changed transmission capability when the transmission capability changes according to the initial transmission capability of the terminal.

3. The method according to claim 2, wherein the initial transmission capability of the terminal comprises at least one of all frequency band combinations and channel combinations that the terminal is configured to support without generating intermodulation interference.

4. The method according to claim 1, wherein the sending the first configuration information to the terminal comprises:
adding the first configuration information to a wireless resource control RRC signaling; and
sending the RRC signaling with the first configuration information to the terminal, such that the terminal obtains the first configuration information from the RRC signaling.

5. The method according to claim 1, wherein the sending the first configuration information to the terminal comprises:
adding the first configuration information to a terminal auxiliary information signaling; and
sending the terminal auxiliary information signaling with the first configuration information to the terminal, such that the terminal obtains the first configuration information from the terminal auxiliary information signaling.

6. The method according to claim 1, further comprising:
receiving a capability update reporting information sent by the terminal, the capability update reporting information comprises the changed transmission capability of the terminal;
configuring a corresponding transmission link for the terminal according to the changed transmission capability of the terminal; and
sending an identification information of the corresponding transmission link to the terminal.

7. The method according to claim 6, wherein the sending the identification information of the corresponding transmission link to the terminal comprises:
adding the identification information of the corresponding transmission link to a wireless resource configuration information; and
sending the wireless resource configuration information with the identification information of the corresponding transmission link to the terminal, such that the terminal obtains the identification information of the corresponding transmission link from the wireless resource configuration information.

8. A communication system implementing the transmission configuration method according to claim 1, comprising the base station and the terminal, wherein the terminal is configured to:
report the changed transmission capability, with permission of the base station, without updating transmission capability information of the terminal by detaching or reattaching, thereby meeting individual needs of the terminal for dynamically reporting the changed transmission capability without affecting service performance and user experience of the terminal;
receive the first configuration information sent by the base station;
when the transmission capability changes, acquire the changed transmission capability of the terminal according to the first configuration information; and
send the changed transmission capability of the terminal to the base station;
wherein the base station is configured to configure a corresponding transmission link for the terminal according to the changed transmission capability of the terminal, thereby improving data transmission quality and improving transmission resource utilization.

9. A transmission configuration method, applied to a terminal, comprising:
receiving a first configuration information sent by a base station, the first configuration information characterizing that the terminal is allowed to report a changed transmission capability when a transmission capability changes;
when the transmission capability changes, acquiring the changed transmission capability of the terminal according to the first configuration information;
sending the changed transmission capability of the terminal to the base station, such that the base station configures a corresponding transmission link for the terminal according to the changed transmission capability of the terminal;
receiving a second configuration information sent by the base station, the second configuration information is used to characterize that the terminal is not allowed to report the changed transmission capability when the transmission capability changes; and
not reporting the changed transmission capability according to the second configuration information when the transmission capability changes, and continuing to perform data transmission by using a transmission link configured by the base station.

10. The method according to claim 9, further comprising:
sending an initial capability reporting information to the base station, the initial capability reporting information comprises an initial transmission capability of the base station.

11. The method according to claim 10, wherein the initial transmission capability of the terminal comprises at least one of all frequency band combinations and channel combinations that the terminal is capable of supporting without generating intermodulation interference.

12. The method according to claim 9, wherein the sending the changed transmission capability of the terminal to the base station comprises:
adding the changed transmission capability of the terminal to a capability update reporting information; and
sending the capability update reporting information with the changed transmission capability of the terminal to the base station, such that the base station obtains the changed transmission capability of the terminal from the capability update reporting information.

13. The method according to claim 9, further comprising:
receiving an identification information of the corresponding transmission link sent by the base station, the corresponding transmission link is a corresponding transmission link configured by the base station for the terminal according to the changed transmission capability of the terminal; and
using the corresponding transmission link to perform data transmission.

14. A transmission configuration apparatus, applied to a terminal, comprising:
a processor;
memory storing instructions for execution by the processor;
wherein the processor is configured to:
receive a first configuration information sent by a base station, the first configuration information characterizing that the terminal is allowed to report a changed transmission capability when a transmission capability changes;
acquire the changed transmission capability of the terminal according to the first configuration information when the transmission capability changes;

send the changed transmission capability of the terminal to the base station, such that the base station configures a corresponding transmission link for the terminal according to the changed transmission capability of the terminal;

receive a second configuration information sent by the base station, the second configuration information is used to characterize that the terminal is not allowed to report the changed transmission capability when the transmission capability changes; and not report the changed transmission capability according to the second configuration information when the transmission capability changes, and continuing to perform data transmission by using a transmission link configured by the base station.

15. The transmission configuration apparatus according to claim 14, wherein the processor is further configured to:

send an initial capability reporting information to the base station, the initial capability reporting information comprises an initial transmission capability of the base station;

wherein the initial transmission capability of the terminal comprises at least one of all frequency band combinations and channel combinations that the terminal is capable of supporting without generating intermodulation interference.

16. The transmission configuration apparatus according to claim 14, wherein the processor is configured to send the changed transmission capability of the terminal to the base station comprises:

add the changed transmission capability of the terminal to a capability update reporting information; and send the capability update reporting information with the changed transmission capability of the terminal to the base station, such that the base station obtains the changed transmission capability of the terminal from the capability update reporting information.

17. The transmission configuration apparatus according to claim 14, wherein the processor is further configured to:

receive an identification information of the corresponding transmission link sent by the base station, the corresponding transmission link is a corresponding transmission link configured by the base station for the terminal according to the changed transmission capability of the terminal;

use the corresponding transmission link to perform data transmission.

* * * * *